US012071752B2

(12) United States Patent
Santha

(10) Patent No.: US 12,071,752 B2
(45) Date of Patent: Aug. 27, 2024

(54) WATER SHOWER AND A METHOD TO SAVE WATER

(71) Applicant: Suresh Kumar Santha, Bangalore (IN)

(72) Inventor: Suresh Kumar Santha, Bangalore (IN)

( * ) Notice: Subject to any disclaimer, the term of this patent is extended or adjusted under 35 U.S.C. 154(b) by 523 days.

(21) Appl. No.: 17/256,190

(22) PCT Filed: May 13, 2019

(86) PCT No.: PCT/IB2019/053927

§ 371 (c)(1),
(2) Date: Dec. 25, 2020

(87) PCT Pub. No.: WO2020/003017

PCT Pub. Date: Jan. 2, 2020

(65) Prior Publication Data

US 2021/0262209 A1 Aug. 26, 2021

(30) Foreign Application Priority Data

Jun. 26, 2018 (IN) ............................ 201841023745

(51) Int. Cl.
*E03C 1/05* (2006.01)
*B05B 12/12* (2006.01)
(Continued)

(52) U.S. Cl.
CPC ............ *E03C 1/057* (2013.01); *B05B 12/122* (2013.01); *E03C 1/0408* (2013.01);
(Continued)

(58) Field of Classification Search
CPC ..... E03C 1/057; E03C 1/0408; B05B 12/122; B05B 1/18; B05B 1/30; B05B 3/04;
(Continued)

(56) References Cited

U.S. PATENT DOCUMENTS 5,718,380 A * 2/1998 Schorn ................ B05B 15/5225
239/117
2013/0333764 A1* 12/2013 Wright .................. E03C 1/0408
137/551
2016/0258144 A1* 9/2016 Tayenaka ............... G05D 27/02

FOREIGN PATENT DOCUMENTS

CN 202778764 * 8/2012
DE 4325971 C1 * 2/1995

OTHER PUBLICATIONS

English translation DE4325971 C1 (Year: 1995).*

* cited by examiner

*Primary Examiner* — Qingzhang Zhou
(74) *Attorney, Agent, or Firm* — Law Office of Heena N. Kampani; Heena N. Kampani

(57) ABSTRACT

An embodiment of the present disclosure provides a water shower comprising: a shower head connected to a water supply unit and comprising a plurality of nozzles to discharge water; at least one sensor configured to sense an object in a specific zone; and a controller operatively coupled with the at least one sensor to operate discharge of water through each nozzle of the plurality of nozzles, wherein a one or more nozzles of the plurality of nozzles are opened (and closed) individually by respective actuators, based on detection of the object by sensor, in direction of water flow through one or more nozzles. The saving of water is achieved by individually opening each nozzle of shower head such that water is discharged only through those nozzles in direction of which, an object is detected and closed when the object is not in the direction.

10 Claims, 4 Drawing Sheets

(51) Int. Cl.
*E03C 1/04* (2006.01)
*F21V 33/00* (2006.01)
*F21W 131/30* (2006.01)
*F21Y 115/10* (2016.01)

(52) U.S. Cl.
CPC ....... *F21V 33/004* (2013.01); *F21W 2131/30* (2013.01); *F21Y 2115/10* (2016.08)

(58) Field of Classification Search
CPC ..... B05B 1/16; F21V 33/004; F21W 2131/30; F21Y 2115/10; F21Y 2103/33; E03B 7/07
See application file for complete search history.

WATER SHOWER AND A METHOD TO SAVE WATER

TECHNICAL FIELD

The present invention relates generally to the field of water shower and, more particularly, to a water shower and a method to save water.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Nowadays, water showers with various water flow patterns are available in different sizes, shapes, price, colour, finish, etc. When a user turns a tap that facilitates flow of water to shower head of a water shower, water starts flowing out through outlets/nozzles of the shower head. Thus, water flows out through the nozzles, irrespective of whether the user/object is there in the direction of water jet or not, and not necessarily wetting the user, leading to wastage of water.

There are numerous reasons for wastage of water; for example, usually when water temperature is not right for the user, water is allowed to be flowed till it attends the right temperature. Further, when the user intends to wet a single part of body or an object, the water flow from desired nozzles is used and rest of the water from other nozzles is wasted. Additionally, if the user or the object is moved away from the water flow intermittently, e.g. to get shampoo or soap or any other reason as may be, then at that time the flowing water is wasted. Furthermore, the user usually tends to adjust direction of water jets as per his/her need and usually, such adjustment is performed while the water is flowing through the nozzles and no matter how much a person adjusts the shower head to get the water flow in its desired direction some water is always wasted.

Therefore, a need exists for a water shower and a method that can overcome the above-mentioned and other disadvantages of the existing approaches while saving water.

As used in the description herein and throughout the claims that follow, the meaning of "a,", "an," and "the" includes plural reference unless the context clearly dictates otherwise.

Also, as used in the description herein, the meaning of "in" includes "in" and "on" unless the context clearly dictates otherwise.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Not with standing that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE PRESENT DISCLOSURE

It is a general object of the present disclosure to provide a water shower and a method to save water.

It is another object of the present disclosure to provide a water shower and a method to save water that saves water by operating opening and closing of nozzle(s) based on presence of an object in direction of water jet from respective nozzle(s).

It is another object of the present disclosure to provide a water shower and a method to save water that is easy to use.

It is another object of the present disclosure to provide a water shower that can be remotely controlled.

It is another object of the present disclosure to provide a water shower and a method to save water that can be incorporated into any existing shower systems.

SUMMARY

The present invention relates generally to the field of water shower and, more particularly, to a water shower and method to save water.

An embodiment of the present disclosure provides a water shower comprising: a shower head connected to a water supply unit and comprising a plurality of nozzles to discharge water; at least one sensor configured to sense an object in a specific zone; and a controller operatively coupled with the at least one sensor to operate discharge of water through each nozzle of the plurality of nozzles, wherein one or more nozzles of the plurality of nozzles are opened individually based on detection of the object in direction of water flow through each nozzle of the one or more nozzles.

In an embodiment, the at least one sensor comprises any or a combination of a CCD (charge-coupled device) or CMOS (complementary metal-oxide semiconductor) camera, an infrared sensor, and a depth sensor.

In an embodiment, the water shower further comprises a ring light source configured to indicate the specific zone.

In an embodiment, the water shower further comprises power generation unit to utilize flowing water to generate electricity to be utilized by one or more components of the water shower.

In an embodiment, when the object is not detected for a pre-defined time, the controller operates the plurality of nozzles to stop flow of water through each nozzle of the plurality of nozzles.

In an embodiment, opening and closing of each of the plurality of nozzles is operated individually by operating corresponding actuator of said nozzle through a micro-actuator array.

In an embodiment, the water shower further comprising an infrared receiver configured to receive infrared signals to control the water shower through an infrared remote control.

In an embodiment, the infrared remote control provides a water saving feature to the water shower by operating the micro-actuator array in any or a combination of rain, jet or pulse mode.

In an embodiment, during the pulse mode corresponding actuators of each of the one or more nozzles move in a reciprocating manner for opening and closing of the one or more nozzles.

In an embodiment, the power generation unit works as a motor to increase water pressure in AC-DC mode.

In an embodiment, the at least one sensor is configured to sense an object in a region above 300 mm from floor level.

Another aspect of the present disclosure provides a method of saving water by a water shower, the method comprises: detecting, by at least one sensor, an object in a specific zone; and controlling, by a controller operatively coupled with the at least one sensor, discharge of water through each nozzle of a plurality of nozzles of a shower head connected to a water supply unit, wherein each nozzle of the one or more nozzles is opened individually by dedicated actuator based on detection of the object in direction of water flow through the nozzle of the one or more nozzles.

In an embodiment, the method further comprises closing each nozzle of the one or more nozzles (individually by dedicated actuator) when the object is not detected in the direction of water flow from the nozzle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
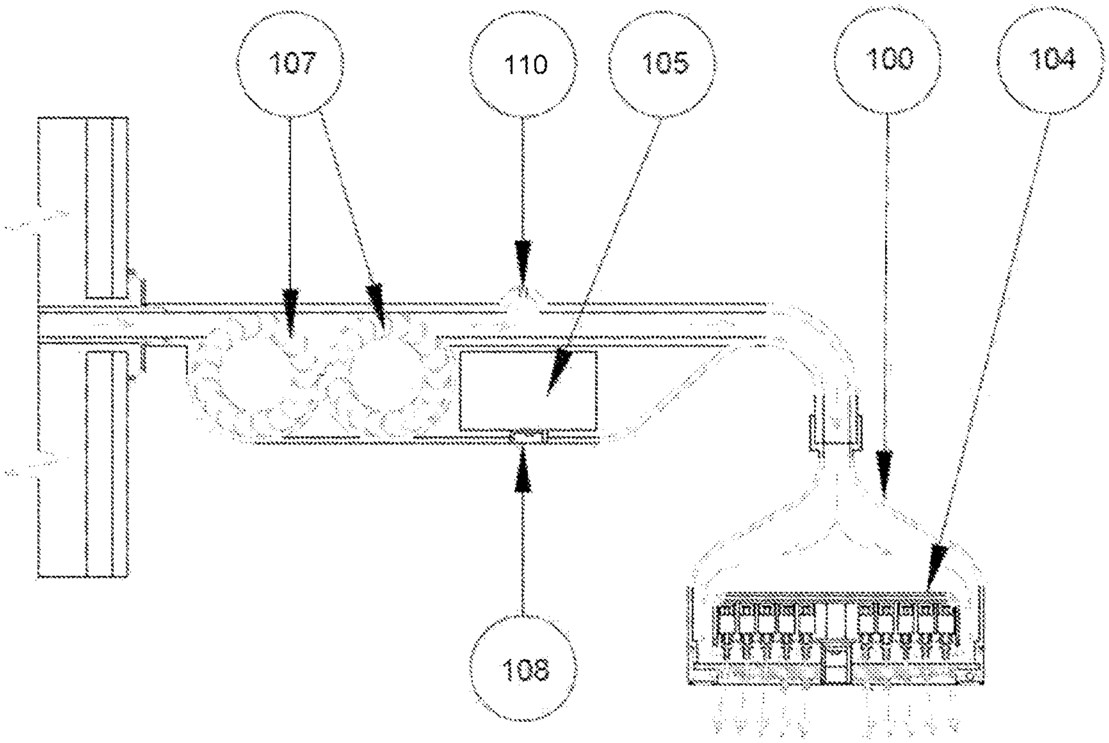
FIG. 1A illustrates a water shower in accordance with an embodiment of the present disclosure.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any electronic code generator shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Various terms as used herein are shown below. To the extent a term used in a claim is not defined below, it should be given the broadest definition persons in the pertinent art have given that term as reflected in printed publications and issued patents at the time of filing.

The present invention relates generally to the field of water shower and, more particularly, to a method to save water while using a water shower.

An embodiment of the present disclosure provides a water shower comprising: a shower head connected to a water supply unit and comprising a plurality of nozzles to discharge water, at least one sensor configured to sense an object in a specific zone; and a controller operatively coupled with the at least one sensor to operate actuators to discharge of water through each nozzle of the plurality of nozzles, wherein one or more nozzles of the plurality of nozzles are opened by each actuator based on detection of the object in direction of water flow through each nozzle of the one or more nozzles.

In an embodiment, the at least one sensor comprises any or a combination of a camera (using CCD or CMOS technology), an infrared sensor and a depth sensor.

In an embodiment, the water shower further comprises a light source configured to indicate the specific zone.

In an embodiment, the water shower further comprises power generation unit to utilize flowing water to generate electricity to be utilized by one or more components of the water shower.

In an embodiment, when the object is not detected for a pre-defined time, the controller operates the plurality of nozzles to stop flow of water through each nozzle of the plurality of nozzles.

In an embodiment, opening and closing of each of the plurality of nozzles is operated individually by operating corresponding actuator of said nozzle through a micro-actuator array.

In an embodiment, the water shower further comprising an infrared receiver configured to receive infrared signals to control the water shower through an infrared remote control.

In an embodiment, the infrared remote control provides a water saving feature to the water shower by operating the micro-actuator array in any or a combination of rain, jet or pulse mode.

In an embodiment, during the pulse mode corresponding actuators of each of the one or more nozzles move in a reciprocating manner for opening and closing of the one or more nozzles.

In an embodiment, the power generation unit indicates a motor to increase water pressure in AC-DC mode.

In an embodiment, the at least one sensor is configured to sense an object in a region above 300 mm from floor level.

Another aspect of the present disclosure provides a method of saving water by a water shower, the method comprises: detecting, by at least one sensor, an object in a specific zone; and controlling, by a controller operatively coupled with the at least one sensor, discharge of water through each nozzle of a plurality of nozzles of a shower head connected to a water supply unit, wherein one or more nozzles of the plurality of nozzles are opened based on detection of the object in direction of water flow through each nozzle of the one or more nozzles.

In an embodiment, the method further comprises closing each nozzle of the one or more nozzles when the object is not detected in the direction of water flow from the nozzle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The present disclosure provides to a water shower and a method to save water. The saving of water is be achieved by individually opening each nozzle of shower head of the water shower such that water is discharged only through those nozzles in direction of which, an object is detected and closing individually those nozzles in direction of which, there is no object/user.

Figure 1B:
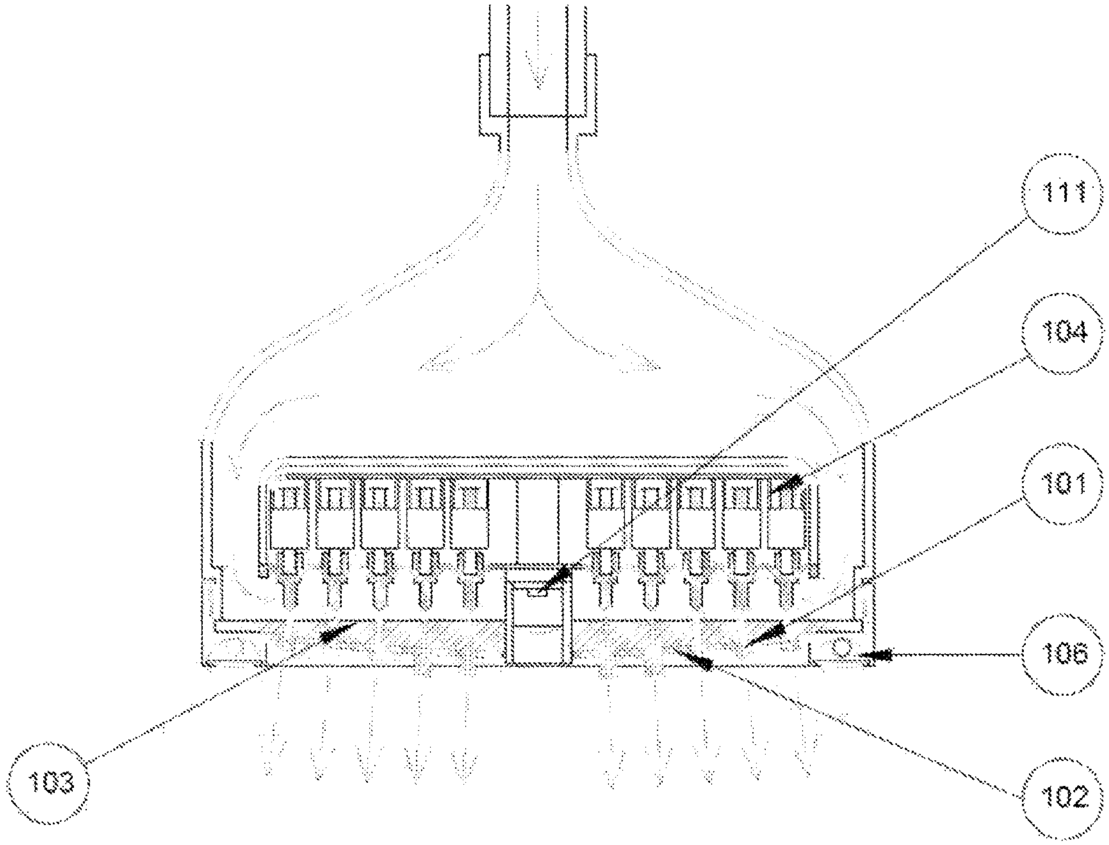
FIG. 1B illustrates a shower head of the water shower in accordance with an embodiment of the present disclosure.

FIG. 1A and FIG. 1B illustrate a water shower and a shower head of the water shower, respectively in accordance with an embodiment of the present disclosure.

According to an embodiment, a water shower can include a shower head 100 connected to water supply unit or a water supply conduit (not shown), micro-actuator array 104, a microcontroller 105, a mini hydro-power generator 107, and an infrared receiver 108. Further, the shower head 100 can include nozzles 101, a shower nozzles guiding plate 102, a special rubber peg sheet 103, a LED light 106, and at least one sensor 111.

According to an embodiment, sensors 111 (which is individually referred to as sensor 111) can be an electronic sensor capable of capturing presence of an object/user in a specific zone. The sensors 111 can include a camera or plurality of camera to captures images of the object with support of necessary lenses, their arrangements and appropriate programming. Alternately, the sensors 111 can include a camera or a plurality of cameras using infrared, CCD (charge-coupled device) or CMOS (complementary metal-oxide semiconductor) technology. In an embodiment the number of pixels (the image sensitivity) of CCD/CMOS can have same or multiples of the number of nozzle 101.

According to an embodiment, data from the sensors 111 can be used by the on-board microcontroller 105 that can include a microprocessor to open and close the nozzles, for discharge of water. The controller 105 can be operatively coupled with the sensors 111 to operate discharge of water through each nozzle of the plurality of nozzles 101 by each actuator, such that one or more each nozzles can be opened by individual actuator based on detection of the object/user in direction of water flow through each nozzle of the one or more of nozzles and rest of the nozzles can be closed.

In an implementation, when a user turns the tap that facilitates the flow of water to the water shower, the water flows through the water supply unit including the pipe line connected to the shower head 100 and finally jets out through the nozzles 101 of the shower head 100. The electricity required for various components of the water shower can be generated by power generation unit that can include one or more mini-hydropower generators 107. The generators 107 can be placed in the pipe line of water flow such that the generators 107 rotate due flow of the water. The electricity can thus be generated with appropriate circuit and programming of the power generation unit with utilization of the regulator switch 110 and microcontroller 105 to activate various components of the water shower. In ac to dc mode the power generation unit can be converted to a motor to increase the water pressure.

According to an embodiment, a light source including one or more Light Emitting Diodes (LEDs) 106, when activated can project a ring light indicating the specific zone e.g. area or boundary within which the shower jets can fall and within which the sensors 111 can detect the user/object. The function of the ring light by LEDs 106 is to indicate the water shower is ON ‘and the light is necessary for the sensor 111 to detect the subject/object or the user.

According to an implementation, pixel layout of the sensors 111 and the nozzles 101 can be determined and placed in an arrangement, such that each nozzle 101 of shower head 100 corresponds to each pixel or plurality of pixels in the sensor 111. These pixels can be electronically addressable. The sensors 111 can be placed/configured such that maximum sensing area of coverage within the boundary/specific zone can be same as that of area covered by water jets from the nozzles 101. The nozzles 101 of the shower head 100 can be opened and closed (individually by each actuator of micro-actuator array 104 controlled by microcontroller 105. The micro-actuator array 104 can be activated as per commands received from microcontroller 105. The sensors 111 can detect the object/user within the direction of the water jets through the nozzles 101, and the data captured can be sent to the internal microcontroller 105. The controller 105 can send the command to micro-actuator array 104 to open only those nozzles 101, where there is the object/user in the direction of water jet from that nozzle 101, while other nozzles 101 can remain closed.

In an implementation, during installation of the water shower, the sensors 111 along with the lens configuration can be set and appropriate program can be installed in the micro controller 105 such that the sensors 111 do not detect the floor as object/user or subject. Further, the microcontroller 105 can be programmed such that sensors 111 do not detect or read any subject/object up to a specific height e.g. 300 mm higher than floor level. Additionally or alternately, the microcontroller 105 can be programmed such that the floor is detected as a subject to wet the user's feet or any other object that needs wetting at the floor level and only few pre-determined nozzles are operated by microcontroller 105 to save water.

According to an implementation, when the user turns the tap, the water shower is turned "ON" as indicated ring light formed by LEDs 106 and water jets out from the nozzles 101 like a normal water shower for a time period of "X" seconds. Once the water from the nozzles 101 jets out, if the user/object is not within the zone indicated by the LED 106 and the object/user is not detected by the sensors 111 with in predetermined time "X" seconds, the microcontroller 105 can send commands to micro-array 104 to close "Z" number of nozzles 101 to stop water flow. The number "Z" can be determined such that while the remaining nozzles 101 remain open facilitating for the water flow, the flow of water is enough for the power generation unit to generate enough electricity for functioning of the components of the water shower.

According to an implementation, when the user/object is within the boundary of the specific zone or part of user's body or any other object enters the boundary, the sensors 111 detects the three "dimensional area" of the body/object that is within the boundary and the data from the sensors 111 can be sent to the microcontroller 105. The microcontroller 105 in turn can send signals to corresponding actuator(s) of the micro-actuator array 104 to open the nozzles 101 to let water flow out (here—each nozzle closed and opened by individual actuator operated by microcontroller). Those skilled in the art would appreciate that default position of all micro solenoids/actuator for the nozzles 101 can be in "pulled" position such that the nozzles 101 can remain open to facilitate water flow such that the electricity is not required for pulled position of solenoids. Therefore, in case of power failure or malfunctioning of electronic components of the water shower, the shower head 100 can work like a normal shower head without water saving feature.

According to an implementation, as the user/object changes position, the sensors 111 constantly captures the images and updates the data, and the same data is simultaneously sent to the microcontroller 105. The microcontroller 105 in turn can send signals to only those actuator(s) which if activated can closet he nozzles 101, so that water does not flow out when there is no user to wet and let water fall on floor or wall, and thereby prevents water wastage. Alternately, the microcontroller 105 can open individual nozzles by individual actuators to let water flow out when there is user in the line of flow from nozzles. Further, when the user wants to stop water flow, he/she can turn the tap to opposite direction such that water stops flowing like any conventional water shower. Those skilled in the art would appreciate that (e.g. when AC-Dc mode of power is used) when the user/object moves away from the specific zone, the water can stop automatically, thereby increasing life of the tap.

In another embodiment, components of the water shower can be powered by direct current (DC), provided by an alternative current (AC) to DC converter or adapter for replacing the mini-generators 107. The converter can be placed outside the water shower for safety reasons and can have provisions for connection 110 of electrical wires with the shower head.

According to an embodiment, the sensors 111 of the water shower is fully or partly provided with a coating or a housing of water repellent material to prevent water or water vapour to get attached on the sensors 111 or the water shower, which may thereby prevent faulty sensing by the sensors 111.

Those skilled in the art would appreciate that various embodiments of the present disclosure can be integrated/incorporated with existing shower heads/water showers with slight modifications.

Figure 1C:
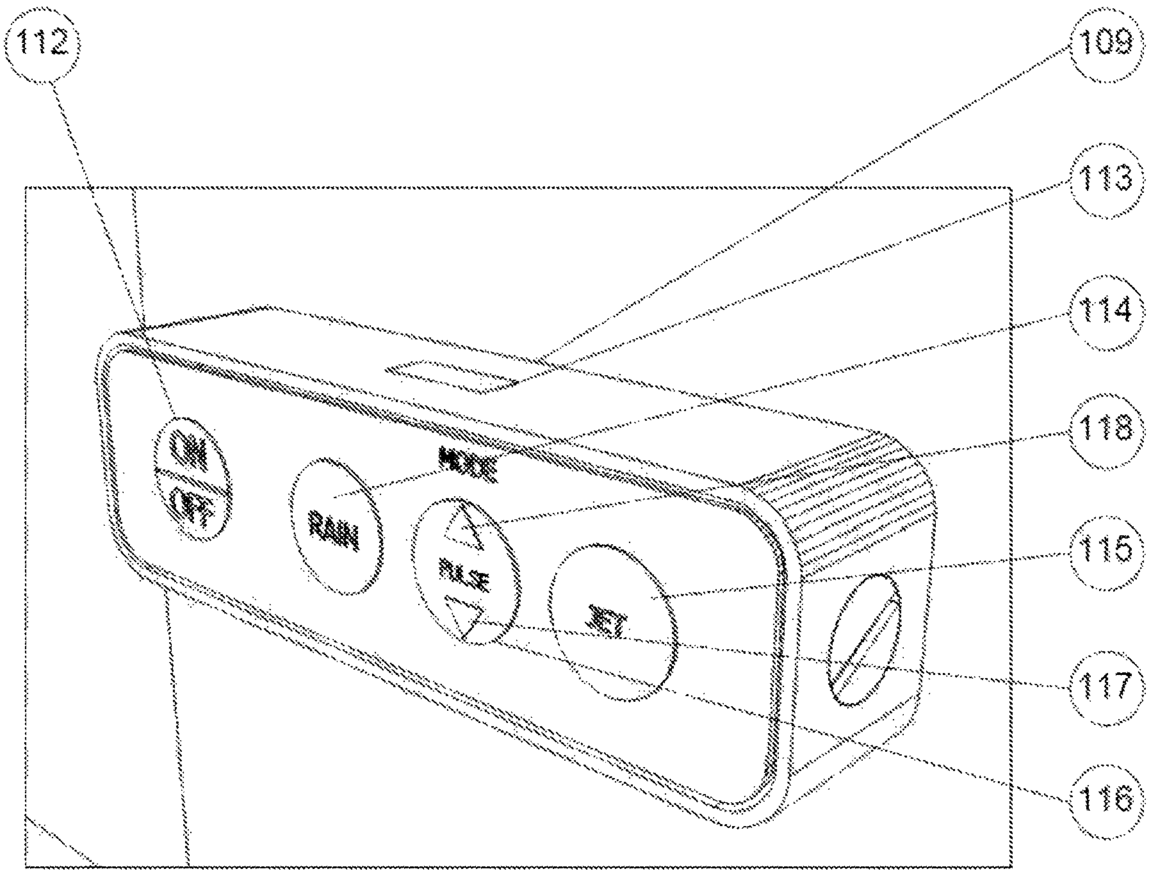
FIG. 1C illustrates an exemplary remote unit to control the water shower in accordance with an embodiment of the present disclosure.

FIG. 1C illustrates an exemplary remote unit to control the water shower in accordance with an embodiment of the present disclosure.

According to an embodiment, the functioning of the water shower can be assisted by a remote unit 109. The remote unit 109 can be powered by dry cell batteries and can be activated by pressing "ON/OFF" switch 112 or hand gesture. The remote unit 109 can communicate with the shower head 100 by infrared transmitter 113 in the remote unit 109 and the infrared receiver 108 of the water shower. The remote unit 109 can have additional switches for activating various modes e.g. rain 114, pulse 116 and jet mode 115. When the user activates rain mode 114, the shower head 100 can provide water jet in a standard continuous flow through all nozzles, but controlled by sensors 111. When jet mode 115 is activated, the predetermined special nozzles can be opened and closed by actuators, while all other nozzles can be closed. As the same quantity of water that enters the shower head 100 is forced to jet out through fewer nozzles in jet mode 115, the pressure of these jets can naturally be higher. While the user can activate only rain mode 114 or jet mode 115 at a time, the user can activate pulse mode 116 while rain mode 114 or jet mode 115 is activated. In pulse mode 116, the solenoid or solenoids (actuator or actuators) of the nozzle or nozzles 101 can move in a reciprocating manner for opening and closing the nozzles very fast, such that continuous stream of water can be converted to continuous output of water drops. The user can increase the duration between drops by pressing down arrow 117 resulting in reduced output of water or decrease the duration between drops by pressing up arrow 118 resulting in increased output of water. In all these modes the sensors 111 can be active and can constantly monitor position of the user/object and can provide commands for actuators to open only those nozzle or nozzles, especially only when sensor 111 detects user/object in imaginary individual line of detection connecting the user/object and nozzle or nozzles 101 and to close when no user/object is detected.

Figure 2:
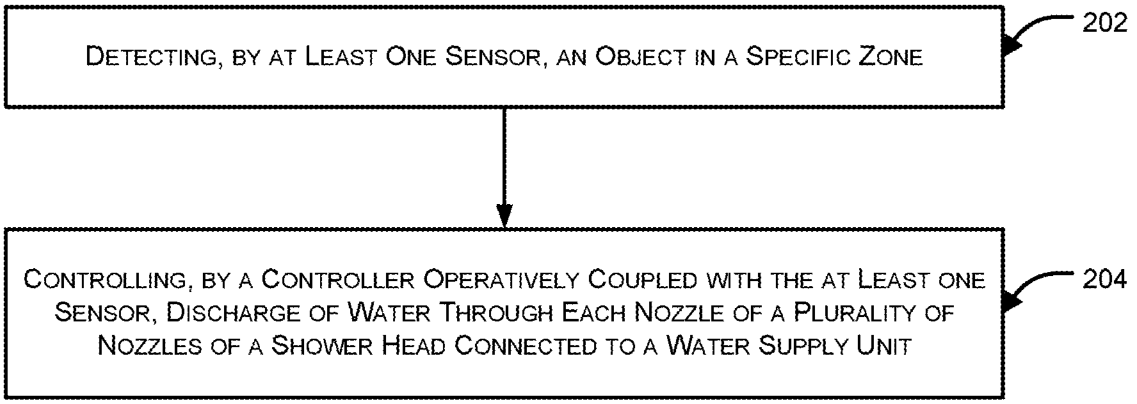
FIG. 2 is an exemplary method to save water according to an embodiment of the present disclosure.

FIG. 2 is an exemplary method to save water according to an embodiment of the present disclosure.

In context of the present example, a method of saving water by a water shower, can include at block 202 detecting, by at least one sensor, an object in a specific zone and at block 204 controlling, by a controller operatively coupled with the at least one sensor, discharge of water through each nozzle of a plurality of nozzles of a shower head connected to a water supply unit, wherein opening and closing of each nozzles is controlled by respective actuator through the controller based on detection of the object in direction of water flow through each nozzle.

Those skilled in the art would appreciate that embodiments of the present disclosure can be utilized not only for the purpose of bathing or wetting parts of the body, but embodiments of the present disclosure can also be utilized for other purposes such as for watering plants or in any washing unit where the intend of the user is to provide water on detection of a specific object such that the water is not wasted.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

ADVANTAGES OF THE PRESENT DISCLOSURE

The present disclosure provides a water shower and a method to save water.

The present disclosure provides a water shower and a method to save water that saves water by operating opening and closing of nozzle individually based on presence of an object in direction of water jet from respective nozzle.

The present disclosure provides a water shower and a method to save water that has an easy handling.

The present disclosure provides a water shower that can be remotely controlled.

The present disclosure provides a water shower and a method to save water that can be incorporated into any existing shower systems.

What is claimed is:

1. A water shower, comprising:

a shower head connected to a water supply unit, wherein the shower head comprises a plurality of nozzles to discharge water;

at least one sensor, wherein the at least one sensor is configured to capture presence of an object in a specific zone, and wherein the specific zone indicates an area within which the water jets fall from the plurality of nozzles and the at least one sensor detects the presence of the object;

a micro-actuator array comprising a plurality of actuators, wherein the plurality of actuators connects to the plurality of nozzles; and a controller operatively coupled with the at least one sensor to operate each nozzle of the plurality of nozzles to discharge the water, wherein the controller selectively opens one or more nozzles of the plurality of nozzles based on detection of the object and direct the flow of the water through each nozzle of the one or more nozzles, wherein the controller opens and closes each nozzle of the plurality of nozzles individually by operating corresponding actuator of said nozzle, wherein the micro-actuator array operates in one of a rain, get and pulse mode, and wherein the actuator corresponding to the nozzle moves in a reciprocating manner for opening and closing the nozzle in the rain, get and pulse mode.

2. The water shower of claim 1, wherein the at least one sensor comprises one of a CCD (charge-coupled device) or CMOS (complementary metal-oxide semiconductor), camera, infrared sensor and a depth sensor.

3. The water shower of claim 1, further comprising a light source configured to indicate the specific zone.

4. The water shower of claim 1, further comprising a power generation unit to utilize flowing water to generate electricity to be utilized by one or more components of the water shower.

5. The water shower of claim 1, further comprising an infrared receiver configured receive infrared signals to control the water shower through an infrared remote control.

6. The water shower of claimed 5, wherein the infrared remote control provides a water saving feature to the water shower by operating the micro-actuator array in one of the rain, jet and pulse mode.

7. The water shower of claim 4, wherein the power generation unit works as a motor to increase water pressure in AC-DC mode.

8. The water shower of claim 1, wherein the at least one sensor is configured to sense the object in a region above 300 mm from floor level.

9. A method of saving water by a water shower, said method comprising the steps of:

providing a shower head connected to a water supply unit, the shower head comprising a plurality of nozzles to discharge water;

providing at least one sensor for detecting an object in a specific zone, the specific zone indicating an area within which the water jets fall from the plurality of nozzles and the at least one sensor detects the presence of the object;

providing a micro-actuator array comprising a plurality of actuators, the plurality of actuators connecting the plurality of nozzles;

providing a controller operatively coupled with the at least one sensor, for discharging of water through each nozzle of the plurality of nozzles; and opening one or more nozzles of the plurality of nozzles individually by operating respective actuators in a reciprocating manner in one of a rain, get and pulse mode, based on detection of the object in the specific zone and directing the flow of water through the one or more nozzles.

10. The method of claim 9, comprising closing each nozzle of the one or more nozzles when the object is not detected in the direction of water flow from said nozzle.

* * * * *